United States Patent
Zhou et al.

(10) Patent No.: US 11,665,714 B2
(45) Date of Patent: May 30, 2023

(54) POWER SAVING BY ADAPTING ACTIVE BEAM NUMBER RELATED PARAMETERS

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/066,440

(22) Filed: Oct. 8, 2020

(65) Prior Publication Data

US 2021/0112542 A1  Apr. 15, 2021

Related U.S. Application Data

(60) Provisional application No. 62/914,312, filed on Oct. 11, 2019.

(51) Int. Cl.
*H04W 72/04* (2023.01)
*H04W 52/02* (2009.01)
(Continued)

(52) U.S. Cl.
CPC ....... *H04W 72/048* (2013.01); *H04W 72/042* (2013.01); *H04W 52/0225* (2013.01);
(Continued)

(58) Field of Classification Search
CPC ............. H04W 76/28; H04W 76/0426; H04W 76/1289; H04W 76/0446; H04W 24/08;
(Continued)

(56) References Cited

U.S. PATENT DOCUMENTS 5,612,701 A * 3/1997 Diekelman .......... H04B 7/2041
455/12.1
8,199,686 B1 * 6/2012 Donovan .............. H04W 76/28
455/343.2
(Continued)

FOREIGN PATENT DOCUMENTS

CN      109076467 A   * 12/2018  ........... H04B 7/0617
EP      3509340 A1     7/2019
(Continued)

OTHER PUBLICATIONS

A. Huang, K. -H. Lin and H. -Y. Wei, "Beam-Aware Cross-Layer DRX Design for 5G Millimeter Wave Communication System," in IEEE Access, vol. 8, pp. 77604-77617, Apr. 2020, doi: 10.1109/ACCESS.2020.2989625. (Year: 2020).*
(Continued)

*Primary Examiner* — William D Cumming
(74) *Attorney, Agent, or Firm* — Patterson + Sheridan, L.L.P.

(57) ABSTRACT

Methods and apparatus for for adapting one or more parameters related to a number of active beams used by a wireless device. An example method generally includes operating in a first mode that involves a first number of active beams for at least one of transmitting or receiving, and taking one or more actions to adapt one or more parameters related to a number of active beams used by the user equipment (UE) to change to a second number of active beams. Another example method generally includes communicating with a UE operating in a first mode that involves a first number of active beams for at least one of transmitting or receiving; and taking one or more actions to adapt one or more parameters related to a number of active beams used by the UE to change to a second number of active beams.

26 Claims, 10 Drawing Sheets

(51) Int. Cl.
*H04W 88/06* (2009.01)
*H04W 72/0453* (2023.01)
*H04W 72/044* (2023.01)

(52) U.S. Cl.
CPC ...... *H04W 72/046* (2013.01); *H04W 72/0453* (2013.01); *H04W 88/06* (2013.01)

(58) Field of Classification Search
CPC ... H04W 52/0274; H04W 16/28; H04W 8/24; H04W 72/042; H04W 52/0242; H04B 7/0617
USPC ...................................................... 455/343.2
See application file for complete search history.

(56) References Cited

U.S. PATENT DOCUMENTS

| | | | |
|---|---|---|---|
| 2017/0346525 A1* | 11/2017 | Stirling-Gallacher ...................... | H04L 5/1469 |
| 2018/0139774 A1* | 5/2018 | Ma ........................ | H04L 1/1896 |
| 2018/0227094 A1 | 8/2018 | Liu et al. | |
| 2019/0313386 A1* | 10/2019 | Hwang ............. | H04W 72/0446 |
| 2020/0045700 A1* | 2/2020 | Sun ........................ | H04L 5/0053 |
| 2020/0252088 A1* | 8/2020 | Jacobs .................... | H04B 1/005 |
| 2020/0252100 A1* | 8/2020 | Jacobs .................... | H04W 8/24 |
| 2020/0396627 A1* | 12/2020 | Hwang ................. | H04W 24/08 |
| 2021/0058136 A1* | 2/2021 | Yang ................... | H04W 72/042 |
| 2021/0112542 A1* | 4/2021 | Zhou ................. | H04W 52/0274 |
| 2021/0297289 A1* | 9/2021 | Manolakos .......... | H04W 52/242 |
| 2022/0394499 A1* | 12/2022 | Matsumura ........... | H04L 5/0051 |

FOREIGN PATENT DOCUMENTS

| | | | | |
|---|---|---|---|---|
| EP | 3682557 B1 * | 7/2020 | ........... | H04B 7/0408 |
| WO | 2019139254 A1 | 7/2019 | | |
| WO | WO-2022149275 A1 * | 7/2022 | ........... | H04B 7/0617 |

OTHER PUBLICATIONS

D. Panno and S. Riolo, "A New Centralized Access Control Scheme for D2D-Enabled mmWave Networks," in IEEE Access, vol. 7, pp. 80697-80716, 2019, doi: 10.1109/ACCESS.2019.2923599. (Year: 2019).*

Y. Liu, X. Fang, M. Xiao and S. Mumtaz, "Decentralized Beam Pair Selection in Multi-Beam Millimeter-Wave Networks," in IEEE Transactions on Communications, vol. 66, No. 6, pp. 2722-2737, Jun. 2018, doi: 10.1109/TCOMM.2018.2800756. (Year: 2018).*

Apple: "Considerations on PDCCH Design for NCJT", 3GPP Draft, 3GPP TSG RAN WG1 Ad-Hoc Meeting 1901, R1-1900749, Considerations on PDCCH Design for NCJT, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593596, 6 Pages.

International Search Report and Written Opinion—PCT/US2020/055103—ISA/EPO—dated May 25, 2021.

Qualcomm Incorporated: "Enhancements on Beam Management for Multi-TRP", 3GPP Draft, 3GPP TSG RAN WG1 Meeting #102-e, R1-2006793, 3rd Generation Partnership Project (3GPP), Mobile Competence Centre, 650, Route Des Lucioles, F-06921 Sophia-Antipolis Cedex, France, vol. RAN WG1, No. Aug. 17, 2020-Aug. 28, 2020, Aug. 8, 2020 (Aug. 8, 2020), XP051918243, 4 Pages.

Qualcomm Incorporated: "Multi-TRP Enhancements", 3GPP Draft, 3GPP TSC-RA WC1 Meeting #98bis, R1-1911126, Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051789902, 26 Pages.

International Search Report and Written Opinion—PCT/US2020/055103—ISA/EPO—dated Mar. 23, 2021.

Partial International Search Report—PCT/US2020/055103—ISA/EPO—dated Jan. 26, 2021.

* cited by examiner

POWER SAVING BY ADAPTING ACTIVE BEAM NUMBER RELATED PARAMETERS

PRIORITY CLAIM(S)

This application claims benefit of the priority to U.S. Provisional Application No. 62/914,312, filed on Oct. 11, 2019, which is expressly incorporated by reference in its entirety as if fully set forth below and for all applicable purposes.

INTRODUCTION

Aspects of the present disclosure relate to wireless communications, and more particularly, to techniques for adapting one or more parameters related to a number of active beams used by a wireless device.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes operating in a first mode that involves a first number of active beams for at least one of transmitting or receiving, and taking one or more actions to adapt one or more parameters related to a number of active beams used by the UE to change to a second number of active beams.

Certain aspects of the present disclosure are directed to an apparatus for wireless communication by a UE. The apparatus generally includes a memory and at least one processor coupled to the memory, the memory and the at least one processor being configured to operate in a first mode that involves a first number of active beams for at least one of transmitting or receiving, and take one or more actions to adapt one or more parameters related to a number of active beams used by the UE to change to a second number of active beams.

Certain aspects of the present disclosure are directed to an apparatus for wireless communication by a UE. The apparatus generally includes means for operating in a first mode that involves a first number of active beams for at least one of transmitting or receiving, and means for taking one or more actions to adapt one or more parameters related to a number of active beams used by the UE to change to a second number of active beams.

Certain aspects of the present disclosure are directed to a computer readable medium having instructions stored thereon for operating in a first mode that involves a first number of active beams for at least one of transmitting or receiving, and taking one or more actions to adapt one or more parameters related to a number of active beams used by the UE to change to a second number of active beams.

Certain aspects provide a method for wireless communication by a network entity (e.g., a first TRP). The method generally includes communicating with a UE operating in a first mode that involves a first number of active beams for at least one of transmitting or receiving, and taking one or more actions to adapt one or more parameters related to a number of active beams used by the UE to change to a second number of active beams.

Certain aspects of the present disclosure are directed to an apparatus for wireless communication by a network entity. The apparatus generally includes a memory and at least one processor coupled to the memory, the memory and the at least one processor being configured to communicate with a UE operating in a first mode that involves a first number of active beams for at least one of transmitting or receiving, and take one or more actions to adapt one or more parameters related to a number of active beams used by the UE to change to a second number of active beams.

Certain aspects of the present disclosure are directed to an apparatus for wireless communication by a network entity. The apparatus generally includes means for communicating with a UE operating in a first mode that involves a first number of active beams for at least one of transmitting or receiving, and means for taking one or more actions to adapt one or more parameters related to a number of active beams used by the UE to change to a second number of active beams.

Certain aspects of the present disclosure are directed to a computer readable medium having instructions stored thereon for communicating with a UE operating in a first mode that involves a first number of active beams for at least one of transmitting or receiving, and taking one or more actions to adapt one or more parameters related to a number of active beams used by the UE to change to a second number of active beams.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
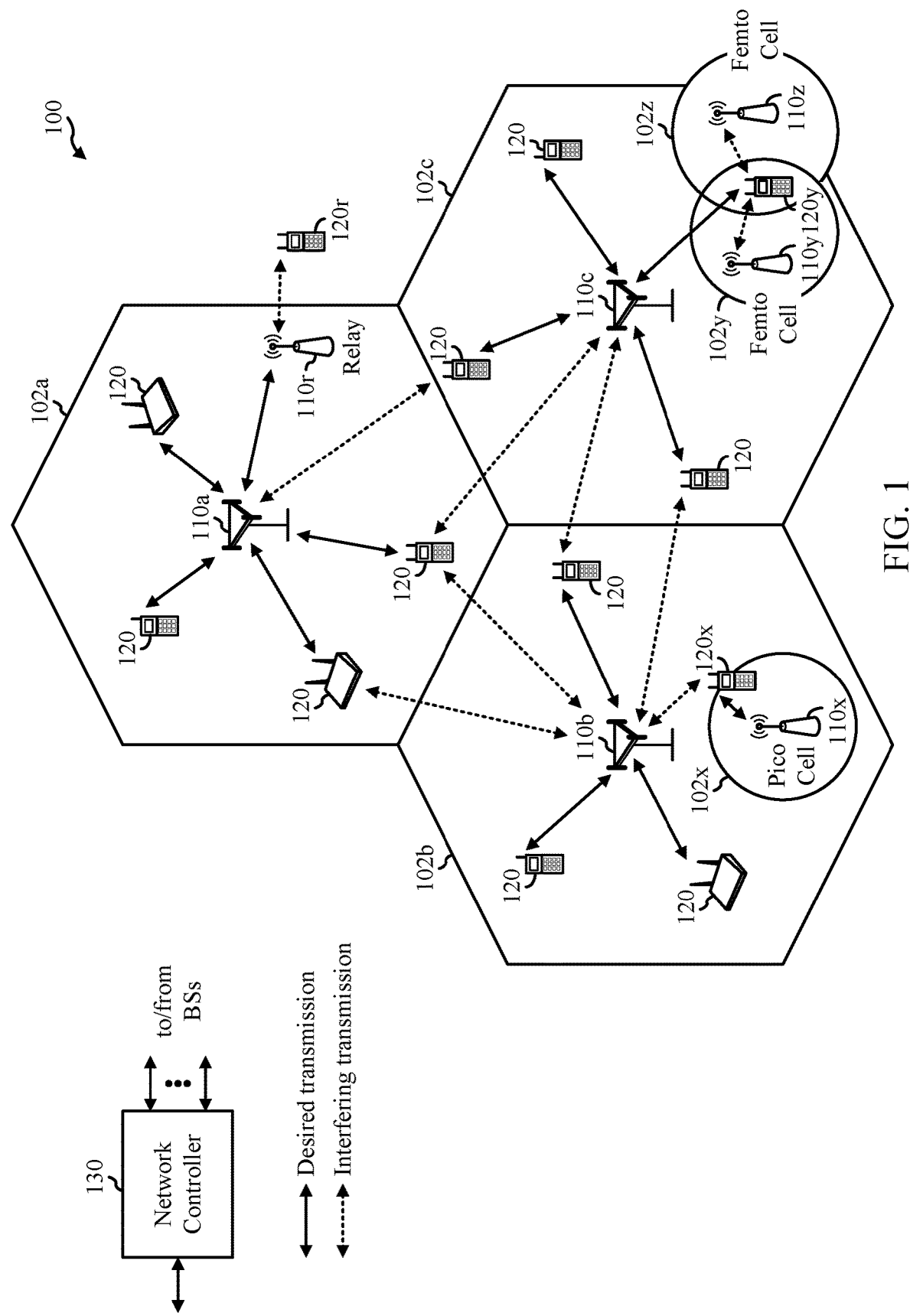
FIG. 1 is a block diagram conceptually illustrating an example telecommunications system, in accordance with certain aspects of the present disclosure.

Aspects of the present disclosure relate to wireless communications, and more particularly, to techniques for adapting one or more parameters related to a number of active beams used by a wireless device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 of wireless communication network 100 may be configured to perform operations 900 of FIG. 9 and/or a BS 110 may be configured to perform operations 1000 of FIG. 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
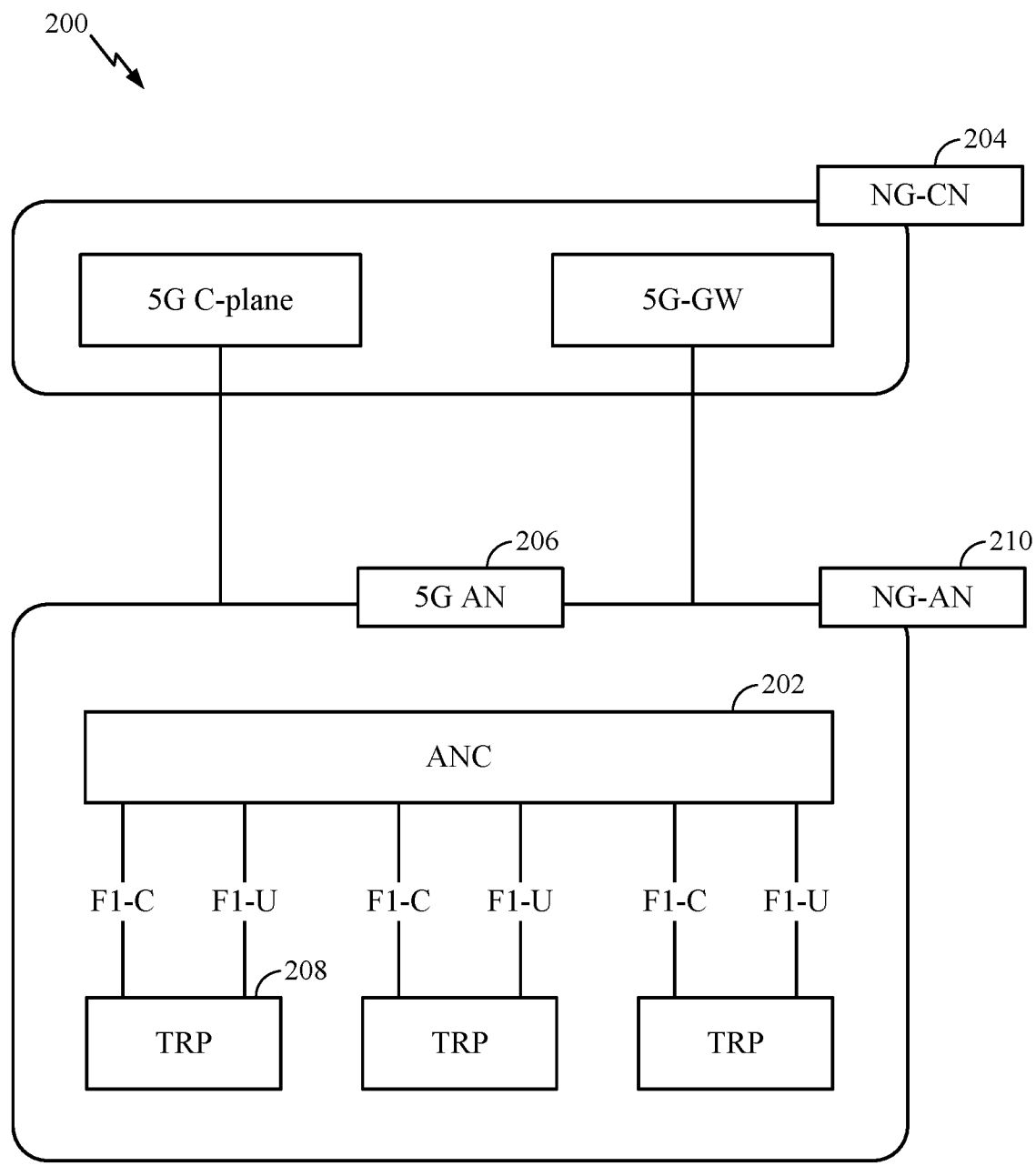
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
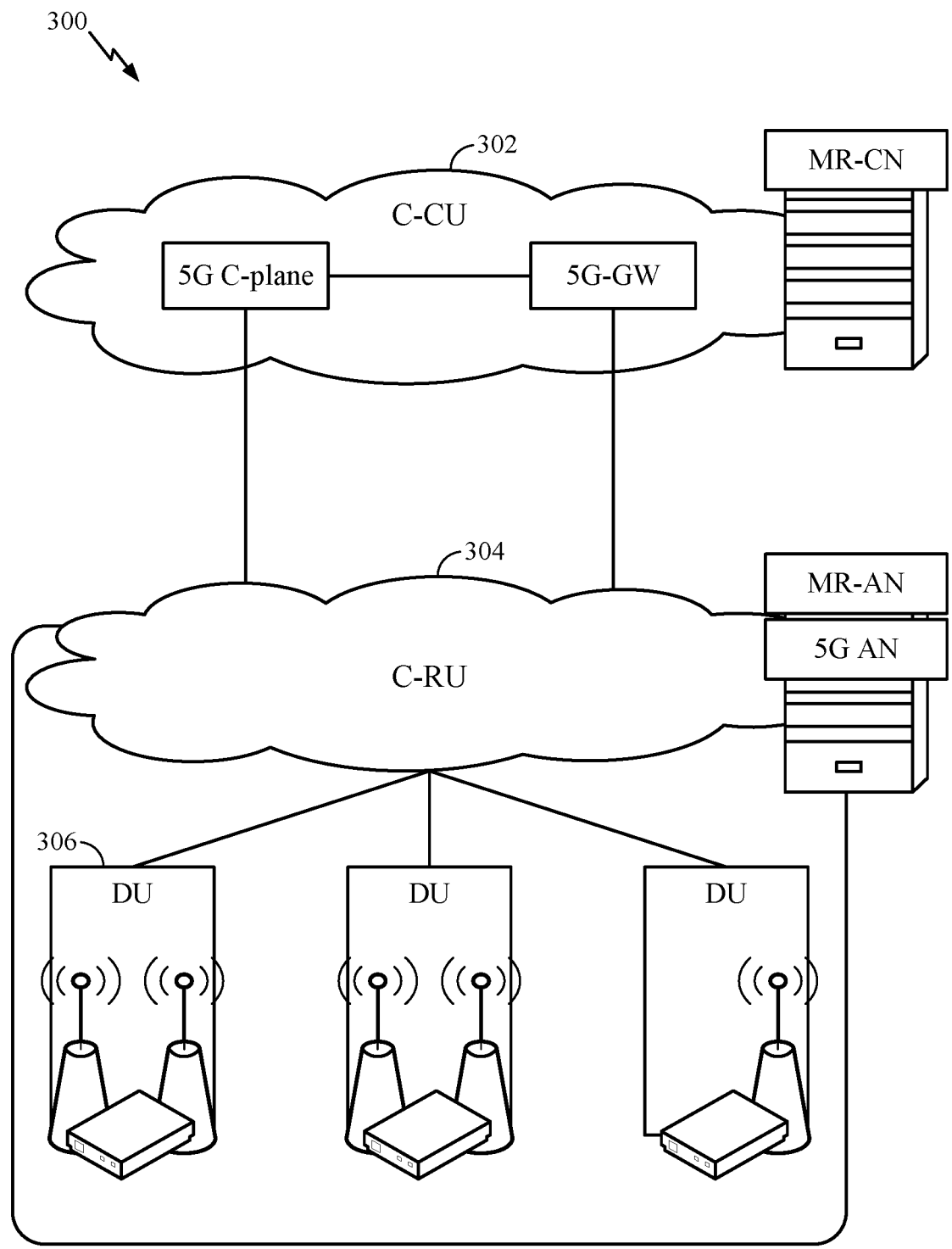
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
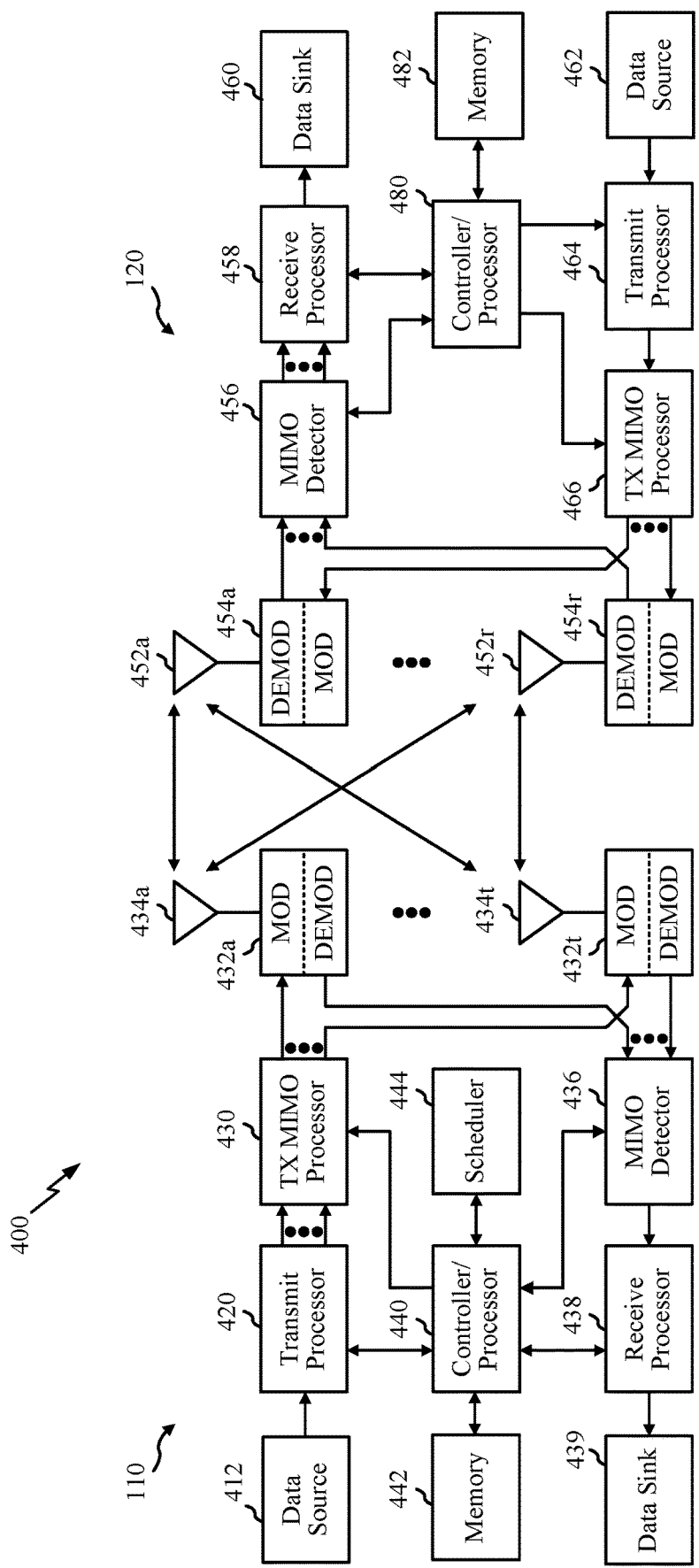
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform operations 900 of FIG. 9 and/or 434, processors 420, 460, 438, and/or controller/processor 440 of the BS 110 may be configured to perform operations 1000 of FIG. 10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
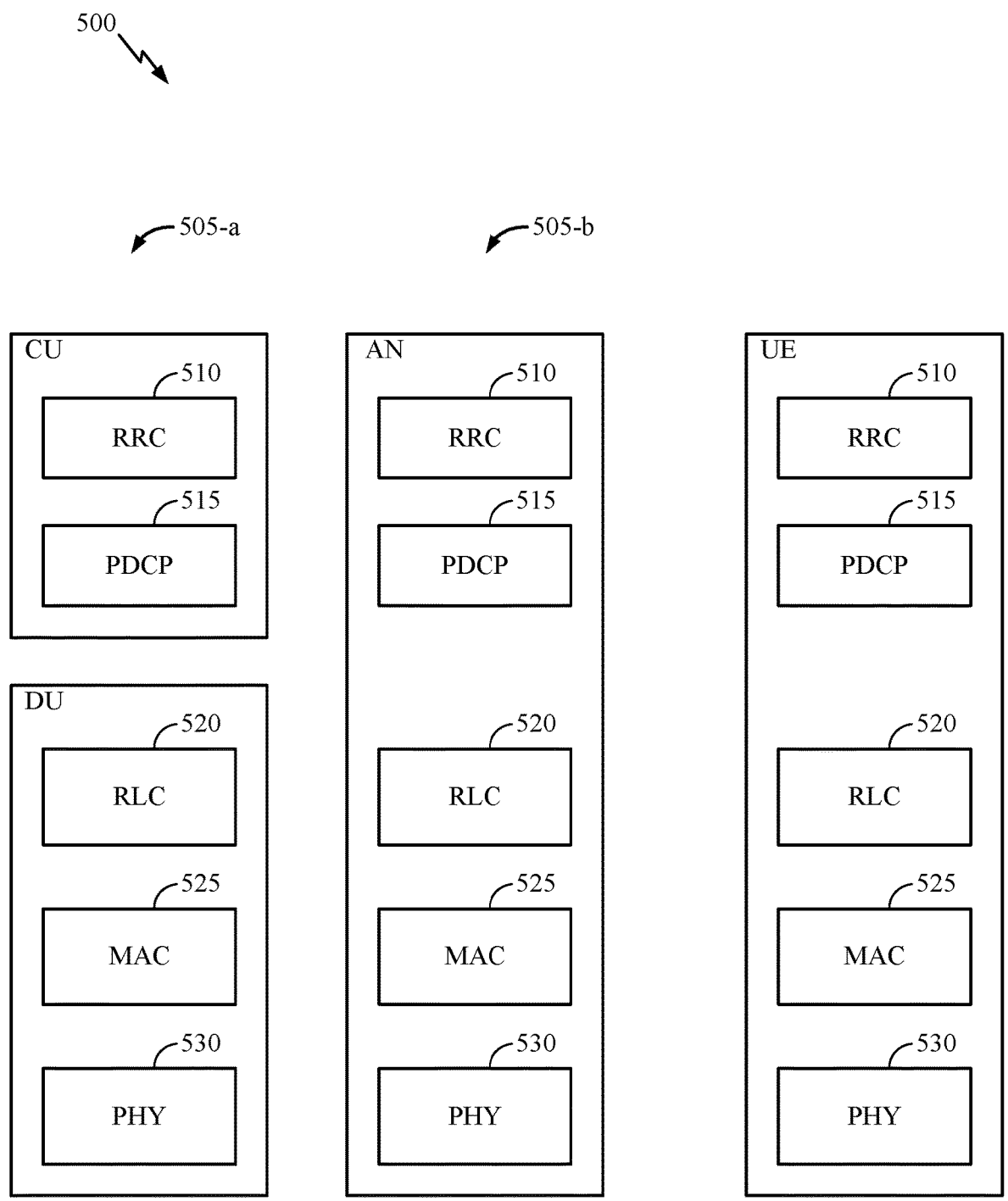
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
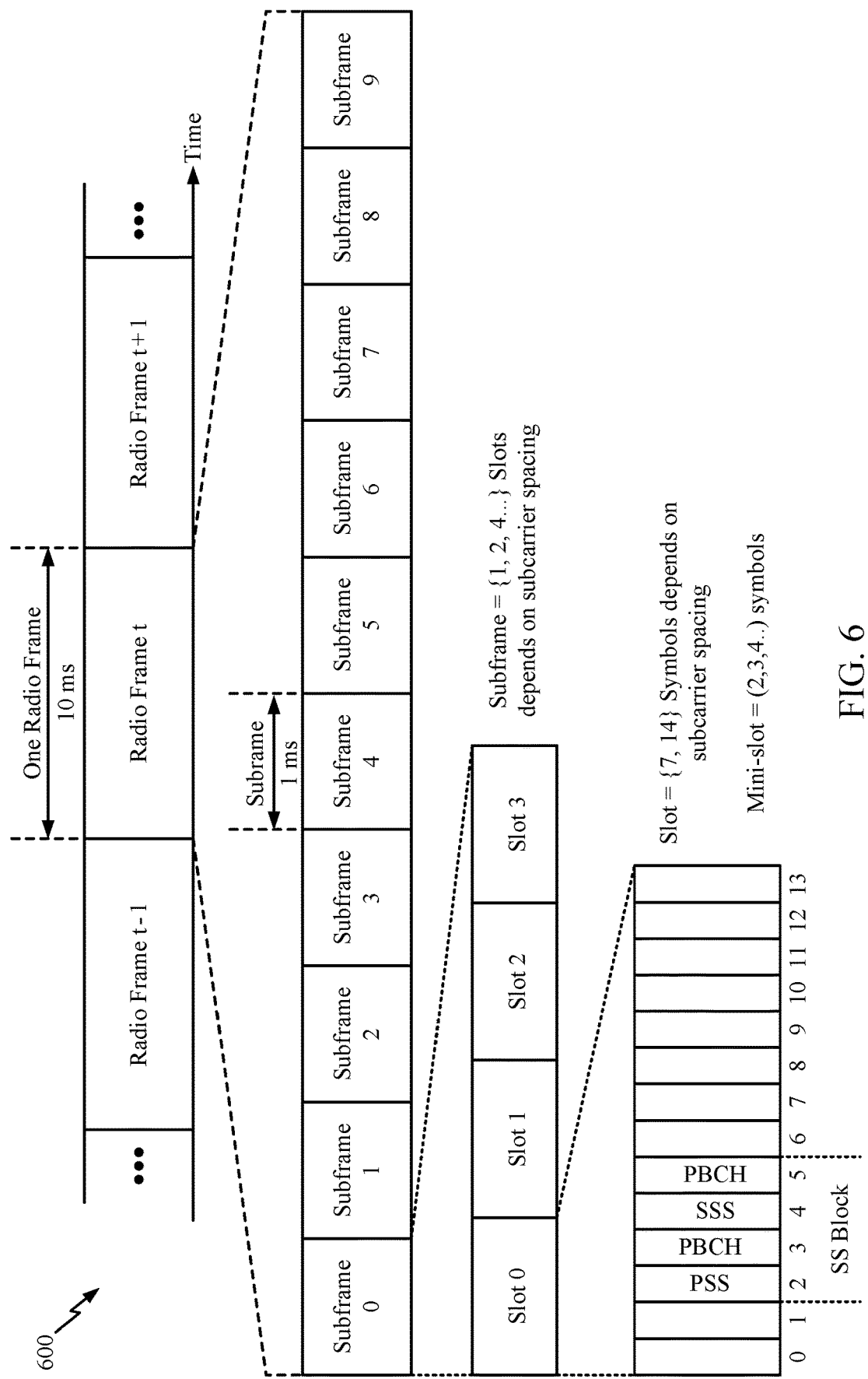
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet-of-Things communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or B S), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Certain systems perform encoding for some physical channels. For example, some systems perform low density parity check (LDPC) encoding. LDPC involve encoding using a base graph with variable nodes corresponding systematic information bits and parity bits and associated check nodes. The encoding may involve lifting the base graph and interconnecting edges in the base graph using cyclic integer lifting values. The base graph is associated with a code rate, which is sometimes referred to as the mother code rate. For example, a first base graph (referred to as BG1, having N=3K) may have a 1/3 rate and a second base graph (referred to as BG2, having N=5K) may be a 1/5 rate. Rate matching may be performed to achieve different code rates, for example, based on available transmission resources at the transmitting device. Puncturing may be performed to drop one or more information bits. One objective of rate matching is to select the particular bits to be transmitted within a transmission time interval (TTI). Rate matching may involve various operations, such as sub-block interleaving, bit collection, and pruning. In some examples, polar coding or other coding the may be used.

Figure 7:
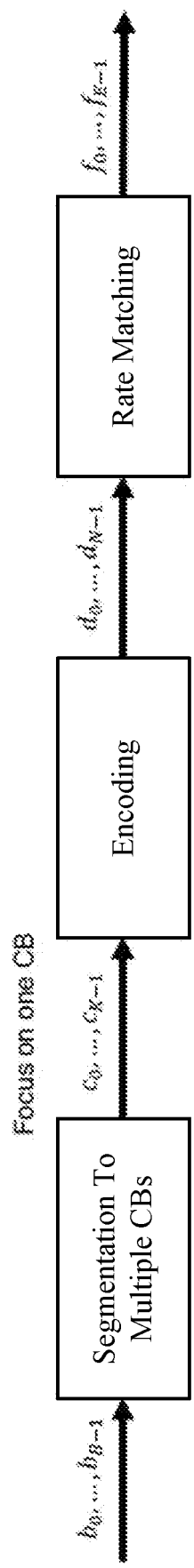
FIG. 7 is a block diagram illustrating an example encoding chain, in accordance with certain aspects of the present disclosure.

FIG. 7 is a block diagram illustrating an example encoding chain, in accordance with certain aspects of the present disclosure. As shown in FIG. 7, a transport block (TB) is segmented into one or more code blocks (CBs), for example, if the TB size is larger than a threshold. The CBs are then encoded. The coded bit sequence for the CB includes information bits and parity bits. After the encoding (and before constellation mapping), rate matching is performed on the coded bits. Each CB may be encoded and rate matched separately.

Example Multi-TRP Transmissions

Advanced systems support multiple input multiple output communications via deployments with enhanced multiple transmit-receiver points (TRPs) and/or TRPs with multiple antenna panels.

In a multi-TRP scenario, multiple TRPs (such as two TRPs) could transmit data to the same UE where the data could belong to the same TB/CB (e.g., same information bits but can be different coded bits) or different TB (e.g., different information bits are sent from multiple TRPs). The UE considers the transmissions from both TRPs and decodes the transmissions accordingly. In some examples, the transmissions from the TRPs is at the same time (e.g., in the same slot, mini-slot, and/or in the same symbols), but across different resource blocks (RBs) and/or different layers. The number of layers and/or the modulation order from each TRP can be the same or different. In some examples, the transmissions from the TRPs can be at different times (e.g., in two consecutive mini-slots or slots). In some examples, the transmissions from the TRPs can be a combination of the above.

Figure 8:
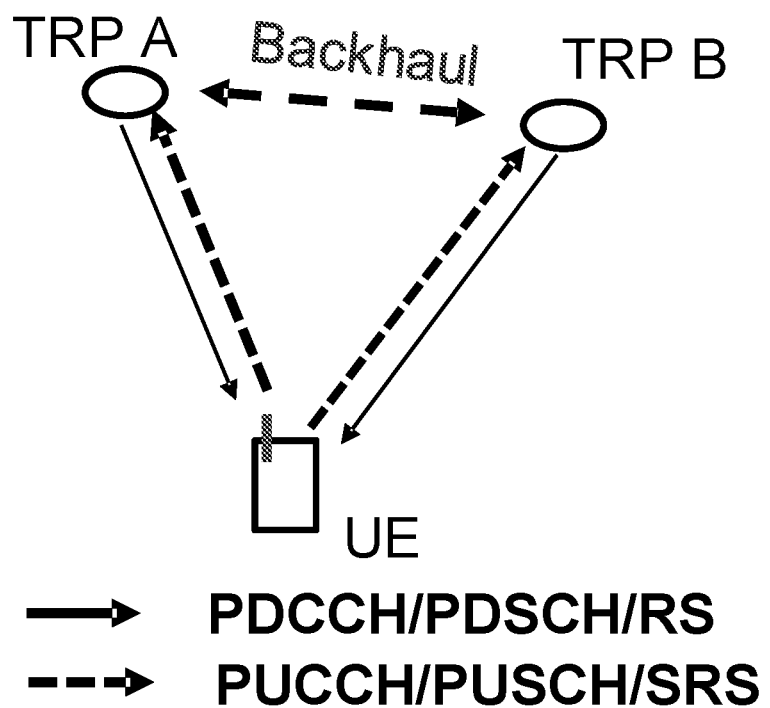
FIG. 8 is a diagram illustrating an example multiple transmission reception point (TRP) transmission scenario, in accordance with certain aspects of the present disclosure.

FIG. 8 is a diagram illustrating an example multi-TRP transmission scenario, in accordance with certain aspects of the present disclosure. In the illustrated example, multiple TRPs (TRP A and TRP B) may communicate with the same UE at the same/different time in a transparent manner either to improve reliability and/or increase throughput. For example, TRP A and TRP B may jointly transmit PDCCH/PDSCH/reference signals (e.g., DMRS) to the same UE. Similarly, on the uplink, the UE may transmit PUCCH/PUSCH/reference signals (e.g., SRS) to the TRPs.

TRP A and TRP B may communicate via a backhaul connection. Ideally, to allow dynamic coordinate between TRPs for the multi-TRP transmission, the backhaul allows communication between TRPs with effectively zero delay and unlimited capacity. Unfortunately, many backhaul connections are not ideal, with limited capacity and substantial delay (e.g., 5 ms delay or even more), which may, prevent dynamic coordination between TRPs. In such cases, coordination between the TRPs may be limited for example, to semi-static coordination.

In multi-TRP scenarios, one downlink control information (DCI) may schedule one or more multiple PDSCH transmissions (from multiple TRPs). The DCI may be transmitted by one or multiple TRPs.

In some cases, multiple DCI may schedule multiple (e.g., 2, 4, or more) PDSCH transmissions. In this case, each DCI may be transmitted by one TRP and schedules the corresponding PDSCH (for that TRP). In this case, it may be assumed that each PDSCH contains one QCL assumption.

Example Power Saving by Adapting Active Beam Number Related Parameters

Aspects of the present disclosure relate to wireless communications, and more particularly, to techniques for adapting one or more parameters related to a number of active beams used by a wireless device.

In certain deployments (e.g., according to Rel-16), a maximum number of downlink (DL) multiple input multiple output (MIMO) layers per DL bandwidth part (BWP) may be supported. This per-DL BWP support may not be limited to the initial and/or default BWP. Because the parameters are per-BWP, during active time, the adaption of maximum number of DL MIMO layers can be achieved by BWP switching.

According to various aspects described herein, power saving can also be achieved by adapting other spatial domain parameters, such as a maximum number of active beams. Adjusting the maximum number of active beams may help save power because, in DL, each active beam requires a separate time and/or frequency tracking loop at a user equipment (UE). In uplink (UL), each active beam may require a separate path loss (PL) reference signal (RS) tracking loop for a corresponding UL power control. Therefore, limiting the maximum number of active beams may reduce power consumption, especially when UE has no larger amount of traffic (e.g., to take advantage of an increased number of beams).

Aspects of the present disclosure may help reduce power consumption at the UE by taking action to adjust one or more parameters that are related to the number of active beams.

Figure 9:
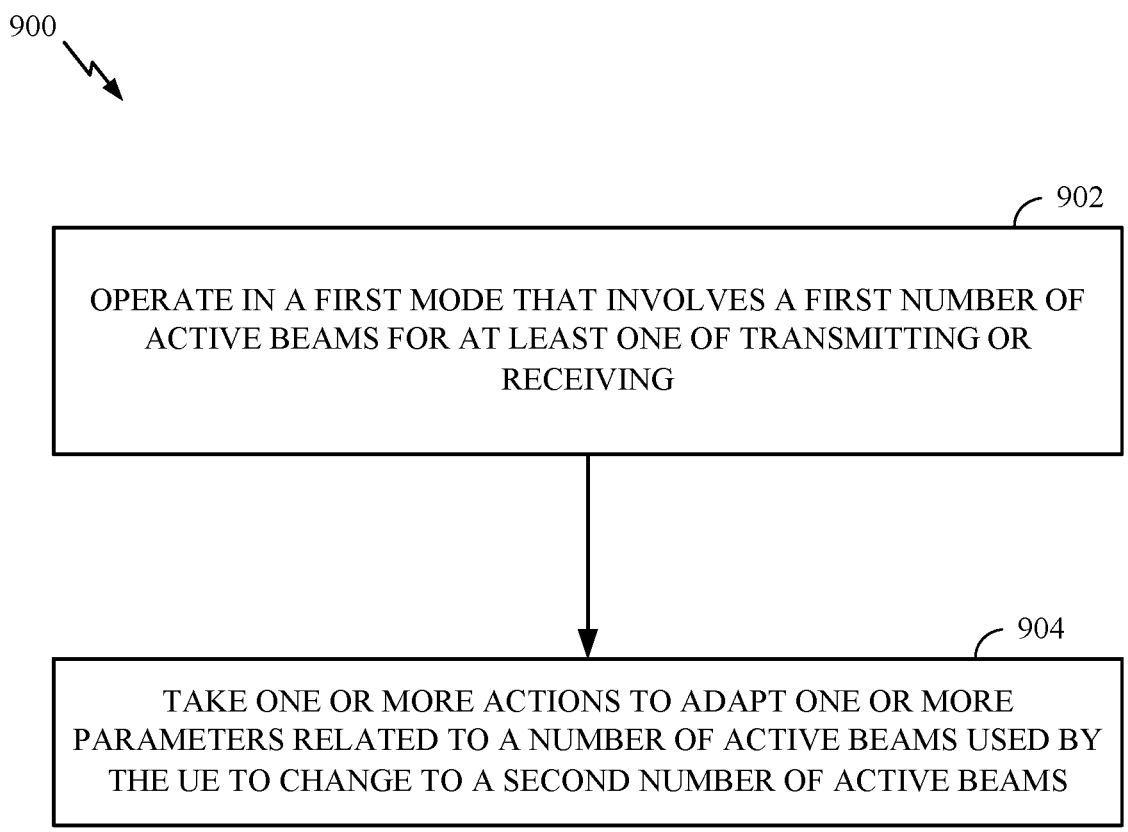
FIG. 9 illustrates example operations that may be performed by a user equipment (UE), in accordance with aspects of the present disclosure.

FIG. 9 illustrates example operations 900 for wireless communications by a UE, in accordance with aspects of the present disclosure. For example, operations 900 may be performed by a UE 120 shown in FIGS. 1 and 4.

Operations 900 begin, at 902, by operating in a first mode that involves a first number of active beams for at least one of transmitting or receiving. At 904, the UE takes one or more actions to adapt one or more parameters related to a number of active beams used by the UE to change to a second number of active beams.

Figure 10:
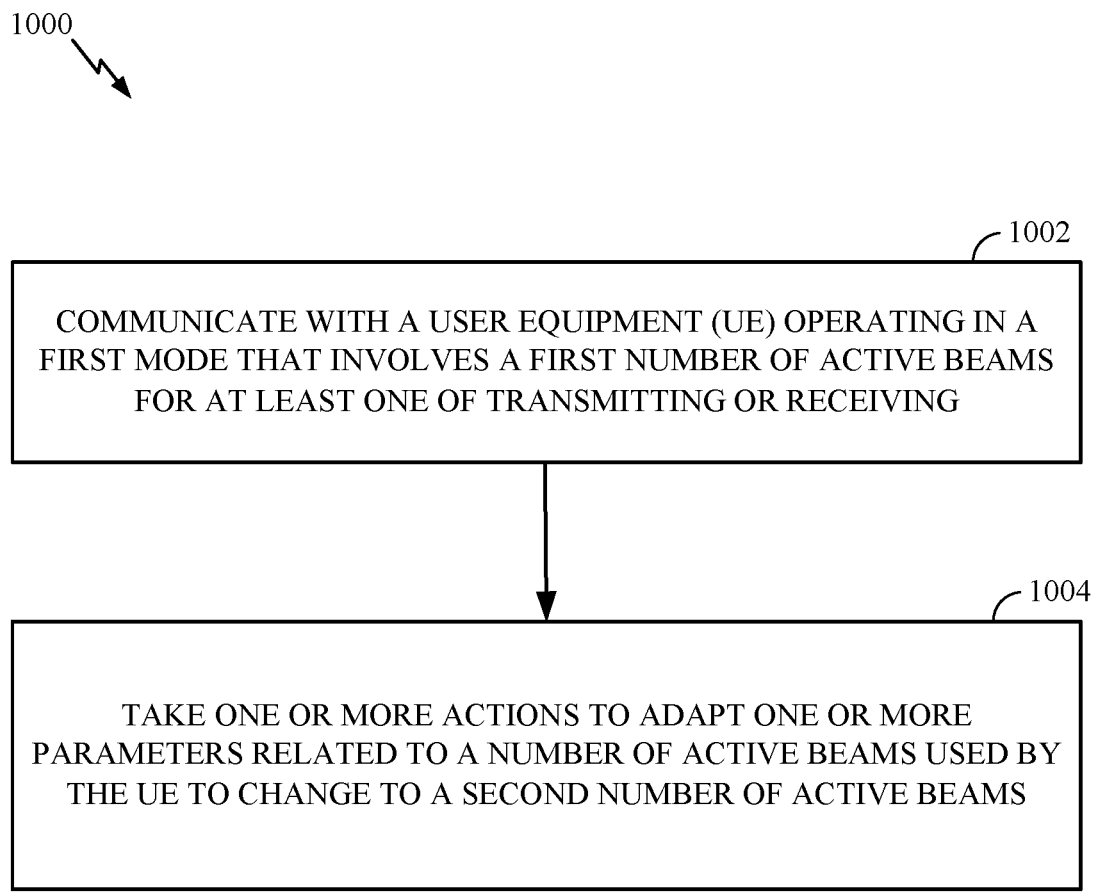
FIG. 10 illustrates example operations that may be performed by a network entity, in accordance with aspects of the present disclosure.

FIG. 10 illustrates example operations 1000 for wireless communications by a network entity, in accordance with aspects of the present disclosure. For example, operations 1000 may be performed by a BS/gNB 110 shown in FIGS. 1 and 4 (or a transmission and reception point (TRP) in a multi-TRP scenario).

Operations 1000 begin, at 1002, by communicating with a UE operating in a first mode that involves a first number of active beams for at least one of transmitting or receiving. At 1004, the network entity takes one or more actions to adapt one or more parameters related to a number of active beams used by the UE to change to a second number of active beams.

According to one proposal, a UE may request a change to one or more parameters related to the number of active beams (e.g., parameters that might impact and/or determine how many beams are active at any given time).

For example, at least for power saving purposes, a UE may request to change one or more of the following parameters related to the number of active beams (also referred to as "active beam number related parameters"):

A maximum number of active beams;
A maximum number of TRPs; and/or
A TRP operation mode (or modes).

For example, a UE may request for the maximum number of active beams to be changed to a value different than the value based on UE capability. Reducing the maximum active beam number in this manner may save power. For example, as noted above, In DL, each active beam requires a separate time and/or frequency tracking loop at UE while, in UL, each active beam may require a separate PL RS tracking loop for corresponding UL power control. As used herein, a maximum active beam number generally includes those in DL (e.g., a number of active TCI states) and/or those in UL (e.g., a number of active spatial relations).

In some cases, a UE may request a different maximum TRP number than what is supported and/or fixed in a standard specification (e.g., the maximum TRP number is 2 in Rel-16). This may also have the impact of reducing the total number of active beams.

In some cases, a UE may request a change to one or more TRP operation mode(s), instead of the operation mode(s) that may be selected based on the UE capability. This may help reduce the number of beams, and certain TRP operation modes may require the UE to support simultaneous multi-panel reception (Rx). Examples of TRP operation modes that a UE may request to change include:

Multiplexing modes;
Multi-TRP (mTRP) operation; and/or
Single downlink control information (DCI) or multiple-DCI based mTRP.

Certain multiplexing modes, including spatial division multiplexing (SDM), frequency division multiplexing (FDM), and/or time division multiplexing (TDM) (on a slot or sub-slot basis) may impact the number of active beams. In some cases, mTRP in DL (e.g., physical downlink shared channel (PDSCH)) may impact the number of reception beams, and/or mTRP in UL (e.g., physical uplink shared channel (PUSCH)) may impact the number of active transmission beams. Single-DCI based mTRP may allow the UE to use fewer reception beams than in a multiple-DCI based mTRP.

According to another proposal, BWP-based active beam number related parameters may be adapted via BWP switching. For example, the various active beam maximum number related parameters described above may be configured per-BWP. As a result, BWP switching may have the effect of adapting these maximum number related parameters.

In some cases, DL active beam maximum number related parameters can be configured to every DL BWP. Alternatively, such parameters may be only limited to the initial and/or default BWP, while other BWPs still use values based on values the reported UE capability.

In some cases, the UL active beam maximum number related parameters can be configured for some or all UL BWPs. This may have the result of reducing the total number of active beams.

In some cases, adaption of DL and/or UL active beam maximum number related parameters can be achieved via DL and/or UL BWP switching, at least during active time. For example, a UE may monitor on a BWP with a smaller number of active beams when no there is not a large amount of traffic (pending for the UE) in order to save power. The UE may then switch to a different BWP with a larger number of active beams to improve throughput and reliability (e.g., via SDM and/or TDM based multi-beam operation).

In some cases, the active beam maximum number related parameters per BWP can also be updated by radio resource control (RRC), MAC-CE, or DCI signalling (e.g., without BWP switching). As an example, the active beam maximum number related parameters can be updated via a power saving signal and/or channel before an active time (e.g., by a wakeup signal before a DRX ON duration).

According to one proposal, active beam maximum number related parameters may be adapted via component carrier (CC) and/or cell switching. For example, the various active beam maximum number related parameters described above may be configured per CC or per cell. As a result, switching CCs or cells may have a similar impact on adapting these parameters as the BWP switching examples described above.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method for wireless communications by a user equipment (UE), comprising operating in a first mode that involves a first number of active beams for at least one of transmitting or receiving, and taking one or more actions to adapt one or more parameters related to a number of active beams used by the UE to change to a second number of active beams.

Embodiment 2: The method of Embodiment 1, wherein the one or more parameters comprise at least one of a maximum number of active beams or a maximum number of transmitter receiver points (TRPs), and taking one or more actions comprise sending a request for at least one of a maximum number of active beams less than a maximum number of active beams indicated via a UE capability, or a maximum number of TRPs less than a maximum number of TRPs supported in a network.

Embodiment 3: The method of Embodiment 1 or 2, wherein taking one or more actions comprises sending a request to change at least one transmitter receiver point (TRP) operating mode to a TRP different than the UE indicated it supports via UE capability.

Embodiment 4: The method of Embodiment 3, wherein the request is to at least one of enable or disable at least one of a spatial division multiplexing (SDM) mode, a frequency division multiplexing (FDM) mode, or a time division multiplexing (TDM) mode, enable or disable a multi-TRP (mTRP) mode for at least one of downlink or uplink communications, or to switch between a single downlink control information (DCI) based mTRP mode and a multi-DCI based mTRP mode.

Embodiment 5: The method of any of Embodiments 1-4, wherein the one or more parameters related to a number of active beams used by the UE comprise at least a first set of one or more parameters related to a number of active beams used by the UE configured for a first set of one or more bandwidth parts (BWPs), and a second set of one or more parameters related to a number of active beams used by the UE configured for a second set of one or more BWPs, and taking one or more actions comprises BWP switching.

Embodiment 6: The method of Embodiment 5, wherein different parameters related to the number of active beams are configured for downlink BWPs and uplink BWPs.

Embodiment 7: The method of Embodiment 5 or 6, wherein the BWP switching is performed based on signaling from a base station.

Embodiment 8: The method of any of Embodiments 5-7, wherein the UE switches between a BWP with a smaller number of active beams and a BWP with a larger number of active beams, based on traffic loading.

Embodiment 9: The method of any of Embodiments 1-8, wherein taking one or more actions to adapt the one or more parameters related to a number of active beams used by the UE to change to a second number of active beams comprises updating one or more of the parameters based on signaling from a base station.

Embodiment 10: The method of Embodiment 9, wherein the signaling comprises a wakeup signal before an on duration of a low power state.

Embodiment 11: The method of Embodiment 9 or 10, wherein the signaling comprises at least one of radio resource control (RRC), media access control (MAC) control element (CE), or downlink control information (DCI) signaling.

Embodiment 12: The method of any of Embodiments 1-11, wherein the one or more parameters related to a number of active beams used by the UE comprise at least a first set of one or more parameters related to a number of active beams used by the UE configured for a first set of one or more component carriers (CCs) or cells, and a second set of one or more parameters related to a number of active beams used by the UE configured for a second set of one or more component carriers (CCs) or cells.

Embodiment 13: A method for wireless communications by a network entity, comprising communicating with a UE operating in a first mode that involves a first number of active beams for at least one of transmitting or receiving, and taking one or more actions to adapt one or more parameters related to a number of active beams used by the UE to change to a second number of active beams.

Embodiment 14: The method of Embodiment 13, wherein the one or more parameters comprise at least one of a maximum number of active beams or a maximum number of TRPs, and taking one or more actions comprise sending a request for at least one of a maximum number of active beams less than a maximum number of active beams indicated via a UE capability, or a maximum number of TRPs less than a maximum number of TRPs supported in a network.

Embodiment 15: The method of Embodiment 13 or 14, wherein taking one or more actions are taken in response to a request, from the UE, to change at least one TRP operating mode to a TRP different than the UE indicated it supports via UE capability.

Embodiment 16: The method of Embodiment 15, wherein the request is to at least one of enable or disable at least one of a spatial division multiplexing (SDM) mode, a FDM mode, or a TDM mode, enable or disable a mTRP mode for at least one of downlink or uplink communications, or to switch between a single DCI based mTRP mode and a multi-DCI based mTRP mode.

Embodiment 17: The method of any of Embodiments 13-16, wherein the one or more parameters related to a number of active beams used by the UE comprise at least a first set of one or more parameters related to a number of active beams used by the UE configured for a first set of one or more BWPs, and a second set of one or more parameters related to a number of active beams used by the UE configured for a second set of one or more BWPs, and taking one or more actions comprises signaling the UE to perform BWP switching.

Embodiment 18: The method of Embodiment 17, wherein different parameters related to the number of active beams are configured for downlink BWPs and uplink BWPs.

Embodiment 19: The method of Embodiment 17 or 18, wherein the BWP switching is performed based on signaling from a base station.

Embodiment 20: The method of any of Embodiments 17-19e

Embodiment 21: The method of any of Embodiments 13-20, wherein taking one or more actions to adapt the one or more parameters related to a number of active beams used by the UE to change to a second number of active beams comprises signaling the UE to update one or more of the parameters based on signaling from a base station.

Embodiment 22: The method of Embodiment 21, wherein the signaling comprises a wakeup signal before an on duration of a low power state.

Embodiment 23: The method of Embodiment 21 or 22, wherein the signaling comprises at least one of RRC, MAC-CE, or DCI signaling.

Embodiment 24: The method of any of Embodiments 13-23, wherein the one or more parameters related to a number of active beams used by the UE comprise at least a first set of one or more parameters related to a number of active beams used by the UE configured for a first set of one or more CCs or cells, and a second set of one or more parameters related to a number of active beams used by the UE configured for a second set of one or more CCs or cells.

Embodiment 25: An apparatus for wireless communication by a UE, comprising a memory and at least one processor coupled to the memory, the memory and the at least one processor being configured to operate in a first mode that involves a first number of active beams for at least one of transmitting or receiving, and take one or more actions to adapt one or more parameters related to a number of active beams used by the UE to change to a second number of active beams.

Embodiment 26: The apparatus of Embodiment 25, wherein the one or more parameters comprise at least one of a maximum number of active beams or a maximum number of TRPs, and taking one or more actions comprise sending a request for at least one of a maximum number of active beams less than a maximum number of active beams indicated via a UE capability, or a maximum number of TRPs less than a maximum number of TRPs supported in a network.

Embodiment 27: The apparatus of Embodiment 25 or 26, wherein taking one or more actions comprises sending a request to change at least one TRP operating mode to a TRP different than the UE indicated it supports via UE capability.

Embodiment 28: An apparatus for wireless communication by a network entity, comprising a memory and at least one processor coupled to the memory, the memory and the at least one processor being configured to communicate with a UE operating in a first mode that involves a first number of active beams for at least one of transmitting or receiving, and take one or more actions to adapt one or more parameters related to a number of active beams used by the UE to change to a second number of active beams.

Embodiment 29: The apparatus of Embodiment 28, wherein the one or more parameters comprise at least one of a maximum number of active beams or a maximum number of TRPs, and taking one or more actions comprise sending a request for at least one of a maximum number of active beams less than a maximum number of active beams indicated via a UE capability, or a maximum number of TRPs less than a maximum number of TRPs supported in a network.

Embodiment 30: The apparatus of Embodiment 29, wherein taking one or more actions are taken in response to a request, from the UE, to change at least one TRP operating mode to a TRP different than the UE indicated it supports via UE capability.

Embodiment 31: An apparatus for wireless communication by a UE, comprising means for operating in a first mode that involves a first number of active beams for at least one of transmitting or receiving, and means for taking one or more actions to adapt one or more parameters related to a number of active beams used by the UE to change to a second number of active beams.

Embodiment 32: A computer readable medium having instructions stored thereon for operating in a first mode that involves a first number of active beams for at least one of transmitting or receiving, and taking one or more actions to adapt one or more parameters related to a number of active beams used by the UE to change to a second number of active beams.

Embodiment 33: An apparatus for wireless communication by a network entity comprising means for communicating with a UE operating in a first mode that involves a first number of active beams for at least one of transmitting or receiving, and means for taking one or more actions to adapt one or more parameters related to a number of active beams used by the UE to change to a second number of active beams.

Embodiment 34: A computer readable medium having instructions stored thereon for communicating with a UE operating in a first mode that involves a first number of active beams for at least one of transmitting or receiving, and taking one or more actions to adapt one or more parameters related to a number of active beams used by the UE to change to a second number of active beams.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 9 and 10 may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and/or 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
operating in a first mode that involves a first number of active beams for at least one of transmitting or receiving; and
taking one or more actions comprising sending a request to adapt one or more parameters related to a number of active beams used by the UE to change to a second number of active beams, wherein:
the one or more parameters comprise at least one of a maximum number of active beams or a maximum number of transmitter receiver points (TRPs); and
the request comprises a request for at least one of:
a maximum number of active beams less than a maximum number of active beams indicated via a UE capability; or
a maximum number of TRPs less than a maximum number of TRPs supported in a network.

2. The method of claim 1, wherein the request comprises a request to change at least one transmitter receiver point (TRP) operating mode to a TRP different than the UE indicated it supports via UE capability.

3. The method of claim 2, wherein the request is to at least one of:
enable or disable at least one of a spatial division multiplexing (SDM) mode, a frequency division multiplexing (FDM) mode, or a time division multiplexing (TDM) mode;
enable or disable a multi-TRP (mTRP) mode for at least one of downlink or uplink communications; or
to switch between a single downlink control information (DCI) based mTRP mode and a multi-DCI based mTRP mode.

4. A method for wireless communications by a user equipment (UE), comprising:
operating in a first mode that involves a first number of active beams for at least one of transmitting or receiving; and
taking one or more actions to adapt one or more parameters related to a number of active beams used by the UE to change to a second number of active beams, wherein:
the one or more parameters related to a number of active beams used by the UE comprise at least:
a first set of one or more parameters related to a number of active beams used by the UE configured for a first set of one or more bandwidth parts (BWPs); and
a second set of one or more parameters related to a number of active beams used by the UE configured for a second set of one or more BWPs; and
the taking one or more actions comprises BWP switching.

5. The method of claim 4, wherein different parameters related to the number of active beams are configured for downlink BWPs and uplink BWPs.

6. The method of claim 4, wherein the BWP switching is performed based on signaling from a base station.

7. The method of claim 4, wherein the UE switches between a BWP with a smaller number of active beams and a BWP with a larger number of active beams, based on traffic loading.

8. The method of claim 1, wherein the taking one or more actions further comprises updating one or more of the parameters based on signaling from a base station.

9. The method of claim 8, wherein the signaling comprises a wakeup signal before an on duration of a low power state.

10. The method of claim 8, wherein the signaling comprises at least one of radio resource control (RRC), media access control (MAC) control element (CE), or downlink control information (DCI) signaling.

11. A method for wireless communications by a user equipment (UE), comprising:
operating in a first mode that involves a first number of active beams for at least one of transmitting or receiving; and
taking one or more actions comprising sending a request to adapt one or more parameters related to a number of active beams used by the UE to change to a second number of active beams, wherein the one or more parameters related to a number of active beams used by the UE comprise at least:
 a first set of one or more parameters related to a number of active beams used by the UE configured for a first set of one or more component carriers (CCs) or cells; and
 a second set of one or more parameters related to a number of active beams used by the UE configured for a second set of one or more component carriers (CCs) or cells; and
the taking one or more actions further comprises switching CCs or cell switching.

12. A method for wireless communications by a network entity, comprising:
 communicating with a user equipment (UE) operating in a first mode that involves a first number of active beams for at least one of transmitting or receiving;
 receiving a request to adapt one or more parameters related to a number of active beams used by the UE to change to a second number of active beams, wherein:
  the one or more parameters comprise at least one of a maximum number of active beams or a maximum number of transmitter receiver points (TRPs); and
  the request comprises a request for at least one of:
   a maximum number of active beams less than a maximum number of active beams indicated via a UE capability; or
   a maximum number of TRPs less than a maximum number of TRPs supported in a network; and
 taking one or more actions based on the request.

13. The method of claim 12, wherein the request comprises a request to change at least one transmitter receiver point (TRP) operating mode to a TRP different than the UE indicated it supports via UE capability.

14. The method of claim 13, wherein the request is to at least one of:
 enable or disable at least one of a spatial division multiplexing (SDM) mode, a frequency division multiplexing (FDM) mode, or a time division multiplexing (TDM) mode;
 enable or disable a multi-TRP (mTRP) mode for at least one of downlink or uplink communications; or
 to switch between a single downlink control information (DCI) based mTRP mode and a multi-DCI based mTRP mode.

15. A method for wireless communications by a network entity, comprising:
 communicating with a user equipment (UE) operating in a first mode that involves a first number of active beams for at least one of transmitting or receiving;
 taking one or more actions to adapt one or more parameters related to a number of active beams used by the UE to change to a second number of active beams, wherein:
  the one or more parameters related to a number of active beams used by the UE comprise at least:
   a first set of one or more parameters related to a number of active beams used by the UE configured for a first set of one or more bandwidth parts (BWPs), and
   a second set of one or more parameters related to a number of active beams used by the UE configured for a second set of one or more BWPs; and
 the taking one or more actions comprises signaling the UE to perform BWP switching.

16. The method of claim 15, wherein different parameters related to the number of active beams are configured for downlink BWPs and uplink BWPs.

17. The method of claim 15, wherein the BWP switching is performed based on signaling from a base station.

18. The method of claim 15, wherein the network entity signals the UE to switch between a BWP with a smaller number of active beams and a BWP with a larger number of active beams, based on traffic loading.

19. The method of claim 12, wherein the taking one or more actions comprises signaling the UE to update one or more of the parameters based on signaling from a base station.

20. The method of claim 19, wherein the signaling comprises a wakeup signal before an on duration of a low power state.

21. The method of claim 19, wherein the signaling comprises at least one of radio resource control (RRC), media access control (MAC) control element (CE), or downlink control information (DCI) signaling.

22. A method for wireless communications by a network entity, comprising:
 communicating with a user equipment (UE) operating in a first mode that involves a first number of active beams for at least one of transmitting or receiving;
 receiving a request to adapt one or more parameters related to a number of active beams used by the UE to change to a second number of active beams, wherein the one or more parameters related to a number of active beams used by the UE comprise at least:
  a first set of one or more parameters related to a number of active beams used by the UE configured for a first set of one or more component carriers (CCs) or cells; and
  a second set of one or more parameters related to a number of active beams used by the UE configured for a second set of one or more component carriers (CCs) or cells, and
 taking one or more actions based on the request, wherein the taking one or more actions comprises switching CCs or cell switching.

23. An apparatus for wireless communication by a user equipment (UE), comprising:
 a memory and at least one processor coupled to the memory, the memory and the at least one processor being configured to:
  operate in a first mode that involves a first number of active beams for at least one of transmitting or receiving; and
  take one or more actions comprising sending a request to adapt one or more parameters related to a number of active beams used by the UE to change to a second number of active beams, wherein:
   the one or more parameters comprise at least one of a maximum number of active beams or a maximum number of transmitter receiver points (TRPs); and
   the request comprises a request for at least one of:
    a maximum number of active beams less than a maximum number of active beams indicated via a UE capability; or
    a maximum number of TRPs less than a maximum number of TRPs supported in a network.

24. The apparatus of claim 23, wherein the request comprises a request to change at least one transmitter receiver point (TRP) operating mode to a TRP different than the UE indicated it supports via UE capability.

25. An apparatus for wireless communication by a network entity, comprising:
a memory and at least one processor coupled to the memory, the memory and the at least one processor being configured to:
communicate with a user equipment (UE) operating in a first mode that involves a first number of active beams for at least one of transmitting or receiving;
receive a request to adapt one or more parameters related to a number of active beams used by the UE to change to a second number of active beams, wherein:
the one or more parameters comprise at least one of a maximum number of active beams or a maximum number of transmitter receiver points (TRPs); and
the request comprises a request for at least one of:
a maximum number of active beams less than a maximum number of active beams indicated via a UE capability; or
a maximum number of TRPs less than a maximum number of TRPs supported in a network; and
take one or more actions based on the request.

26. The apparatus of claim 25, wherein the request comprises a request to change at least one transmitter receiver point (TRP) operating mode to a TRP different than the UE indicated it supports via UE capability.

* * * * *